US011729546B2

(12) United States Patent
Shumaker et al.

(10) Patent No.: US 11,729,546 B2
(45) Date of Patent: Aug. 15, 2023

(54) TEXTILE-ASSEMBLY TOOLKIT FOR REVERSIBLE ASSEMBLY OF A TEXTILE TO AN ELECTRONIC-SPEAKER DEVICE

(71) Applicant: Google LLC, Mountain View, CA (US)

(72) Inventors: Laura Charlotte Shumaker, Santa Rosa, CA (US); Brian Huynh, San Jose, CA (US); Edmond Lu, Mississauga (CA); Phanindraja Ancha, San Francisco, CA (US); Robert Sean Murphy, Mountain View, CA (US); Myrrhia R. Resneck, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/575,759

(22) Filed: Jan. 14, 2022

(65) Prior Publication Data

US 2022/0232314 A1 Jul. 21, 2022

Related U.S. Application Data

(60) Provisional application No. 63/138,280, filed on Jan. 15, 2021.

(51) Int. Cl.
*H04R 1/28* (2006.01)
*H04R 1/02* (2006.01)
*G06F 3/16* (2006.01)

(52) U.S. Cl.
CPC ........... *H04R 1/2888* (2013.01); *G06F 3/162* (2013.01); *H04R 1/025* (2013.01)

(58) Field of Classification Search
CPC ........ H04R 1/2888; H04R 1/025; G06F 3/162
(Continued)

(56) References Cited

U.S. PATENT DOCUMENTS 4,325,455 A 4/1982 Kirkpatrick
2001/0026627 A1* 10/2001 Tilbury ................... H04R 5/02
381/301
(Continued)

FOREIGN PATENT DOCUMENTS

CN 209517427 10/2019
CN 210168161 3/2020

OTHER PUBLICATIONS

International Search Report and Written Opinion dated Apr. 21, 2022 in International Patent Application No. PCT/US2022/012408.

*Primary Examiner* — Sean H Nguyen
(74) *Attorney, Agent, or Firm* — Kilpatrick Townsend & Stockton LLP

(57) ABSTRACT

The present document describes a textile-assembly toolkit for reversible assembly of a textile to an electronic-speaker device. The toolkit includes multiple attachment features, including rigid features with matched purposefully-designed knit types that can be combined to enable repeatable, mass-producible, reversible assembly of the textile to the electronic-speaker device. The techniques described herein enable accurate alignment of the textile on the electronic-speaker device without distorting the textile's cosmetic pattern and in a manner that results in no visible edges of the textile or visible attachment features on the exterior of the electronic-speaker device. Also, the textile-assembly toolkit includes attachment features that secure the textile with sufficient tension to avoid acoustic distortion such as rub and buzz.

20 Claims, 14 Drawing Sheets

(58) Field of Classification Search
USPC .......................................................... 381/332
See application file for complete search history.

(56) References Cited

U.S. PATENT DOCUMENTS

| | | | |
|---|---|---|---|
| 2009/0103757 A1* | 4/2009 | Chien | ....................... H04R 1/02 |
| | | | 381/345 |
| 2013/0039522 A1* | 2/2013 | Chien | ..................... H04R 31/00 |
| | | | 29/896.2 |
| 2014/0174585 A1 | 6/2014 | Itoh | |
| 2016/0160410 A1 | 6/2016 | Zhang et al. | |
| 2018/0272644 A1 | 9/2018 | Hamada et al. | |
| 2020/0073511 A1 | 3/2020 | Li et al. | |
| 2021/0152903 A1* | 5/2021 | Mietta | ..................... H04R 1/028 |
| 2021/0240436 A1* | 8/2021 | Liddell | .................. H04R 1/023 |

* cited by examiner

Section A—A

Section B-B

TEXTILE-ASSEMBLY TOOLKIT FOR REVERSIBLE ASSEMBLY OF A TEXTILE TO AN ELECTRONIC-SPEAKER DEVICE

CROSS-REFERENCE TO RELATED APPLICATIONS

This application claims the benefit of U.S. Provisional Patent Application No. 63/138,280, filed Jan. 15, 2021, which is hereby incorporated by reference herein in its entirety.

BACKGROUND

Textile coverings for speakers may provide a cosmetic surface that blends into surrounding aesthetics, protects the speaker driver of the speaker from ingress of blunt objects, and enables an opportunity for brand expression. However, attaching textiles to rigid assemblies in a reversible and serviceable way can be challenging, particularly in a mass production setting. Common techniques laminate the textile with adhesive to bond the textile to a plastic housing part for subsequent manipulation and assembly. This adhesive approach is difficult to rework because the adhesive, in some cases, cannot be cleanly delaminated for rework or recycling at end of product life. Further, using adhesive makes it difficult to isolate the textile's contribution from contributions by the assembly processes to a defect in the system's response (e.g., acoustics or light transmission). In some cases, this may result in the entire subassembly being identified as problematic and the textile, adhesive, and plastic housing part being scrapped. Consequently, simply bonding textiles to plastic housing parts can be monetarily costly and lead to large quantities of material waste.

SUMMARY

The present document describes a textile-assembly toolkit for reversible assembly of a textile to an electronic-speaker device. The toolkit includes multiple attachment features, including rigid features with matched purposefully-designed knit types that can be combined to enable a repeatable, mass-producible, and reversible assembly of the textile to the electronic-speaker device. The techniques described herein enable accurate alignment of the textile on the electronic-speaker device to achieve a controlled stretch of the textile across the assembly and in a manner that results in no visible edges of the textile or visible attachment features on the exterior of the electronic-speaker device. Such techniques also enable the textile's cosmetic pattern to be distorted in a controlled manner that is the same across a plurality of different devices and harmonious to the human eye. Further, the textile-assembly toolkit includes attachment features that secure the textile with sufficient tension to avoid acoustic distortion such as rub and buzz.

In some aspects, an electronic-speaker device is disclosed. The electronic-speaker device includes a housing part, a textile a plurality of mechanical attachment features, and a plurality of textile features. The housing part forms a shell having opposing exterior and interior surfaces and at least one opening. The textile is reversibly assembled to the housing part effective to cover the exterior surface of the housing part and wrap around edges of the at least one opening. The plurality of mechanical attachment features are configured for reversible assembly of the textile to the housing part, and the type of attachment feature is selected based on other parts to be assembled or constraints to the assembly near that attachment feature. The plurality of textile features are configured to removably attach the textile to the plurality of mechanical attachment features to align and secure the textile to the housing part with a tension force sufficient to reduce acoustic distortion resulting from a vibration of the textile when exposed to acoustic pressure.

In other aspects, a textile-assembly toolkit for reversible assembly of a textile to an electronic-speaker device is disclosed. The textile-assembly toolkit includes a plurality of mechanical attachment features and a plurality of textile features. The plurality of textile features may be formed in the textile and include knit types configured to connect to one or more of the plurality of mechanical attachment features to enable repeatable and reversible assembly of the textile to the electronic-speaker device in a manner that hides the plurality of textile features and the plurality of mechanical attachment features and leaves no visible edges or visible attachment features on an exterior of the electronic-speaker device.

This summary is provided to introduce simplified concepts of a textile-assembly toolkit for reversible assembly of a textile to an electronic-speaker device, which is further described below in the Detailed Description. This summary is not intended to identify essential features of the claimed subject matter, nor is it intended for use in determining the scope of the claimed subject matter.

BRIEF DESCRIPTION OF THE DRAWINGS

The details of one or more aspects of a textile-assembly toolkit for reversible assembly of a textile to an electronic-speaker device are described in this document with reference to the following drawings. The same numbers are used throughout the drawings to reference like features and components.

DETAILED DESCRIPTION

The present document describes a textile-assembly toolkit for reversible assembly of a textile to an electronic-speaker device. The textile-assembly toolkit described herein includes various features that may be combined for removably attaching a textile to rigid parts of an electronic-speaker device in a manner that visually and tactilely appears to a user to have high quality. The textile-assembly toolkit includes several attachment feature options that can be selected by product design engineers to fit different system requirements. For example, hook and loop may be used for areas of a device that require low thickness, experience high vibration, or are relatively broad. In contrast, buttons may be used for areas that are thicker but require a high accuracy for alignment or blind assembly. Any suitable combination of the features in the textile-assembly toolkit can be implemented for reversible assembly of the textile to the electronic-speaker device.

The textile-assembly toolkit enables a textile to be reversibly assembled to the electronic-speaker device in a manner that wraps at least some of the edges (including all) of a particular housing part of the electronic-speaker device in fabric and leaves no edge of the fabric on the exterior of the housing part. The textile-assembly toolkit also enables the textile to be secured to the housing part with a tension force sufficient to reduce acoustic distortion resulting from vibration of the textile when exposed to acoustic pressure.

While features and concepts of the described textile-assembly toolkit for reversible assembly of a textile to an electronic-speaker device can be implemented in any number of different environments, aspects are described in the context of the following examples.

Example Device

Figure 1:
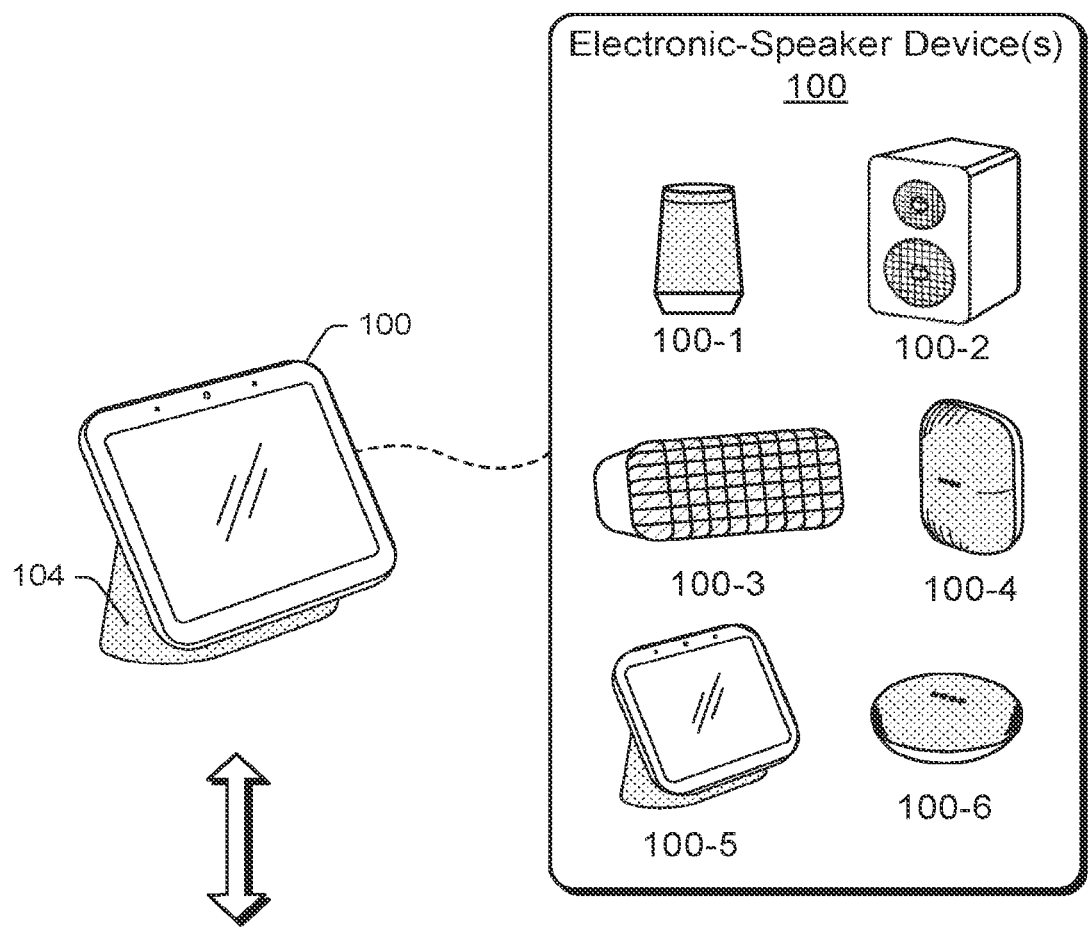
FIG. 1 illustrates an example electronic-speaker device in which an assembly toolkit may be implemented.
Figure 1:
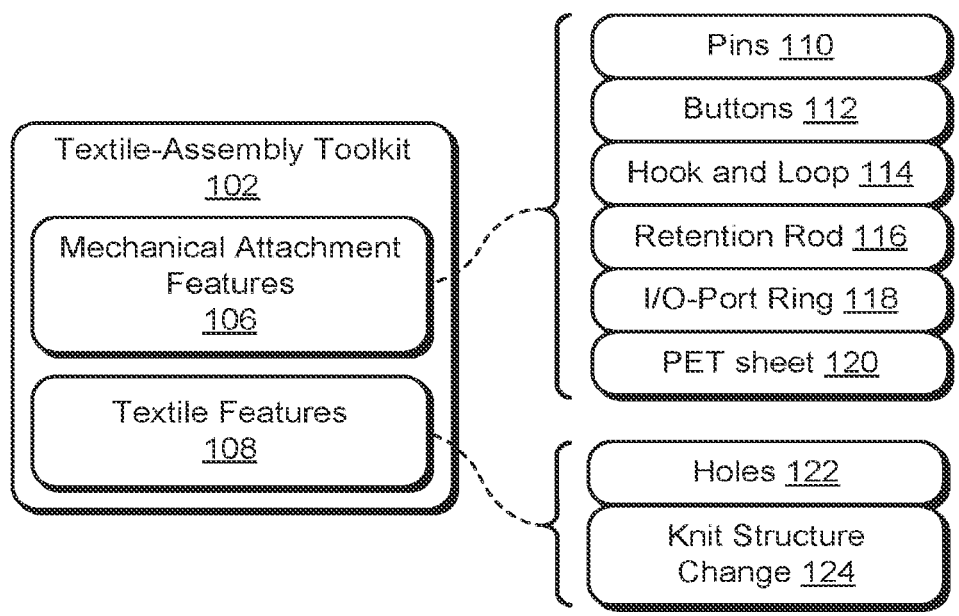

FIG. 1 illustrates an example electronic-speaker device 100 in which a textile-assembly toolkit 102 for reversible assembly of a textile 104 to the electronic-speaker device 100 can be implemented. The electronic-speaker device 100 can be any suitable speaker device, which is configured to generate audio output and/or receive audio input. The electronic-speaker device 100 may include one or more speaker-driver components for generating audio output and/or one or more audio sensors for receiving audio input. Some example electronic-speaker devices include speaker devices 100-1, 100-2, 100-3, 100-4, 100-5, and 100-6. The textile 104 may be mounted to the electronic-speaker device 100 in any suitable manner, including a manner in which the textile 104 covers a face of the electronic-speaker device 100 and/or the speaker-driver component(s). The part on which the textile 104 is assembled may have a substantially symmetric geometry or a substantially asymmetric geometry relative to one or more axes. As described herein, different geometries may utilize different combinations of attachment features of the textile-assembly toolkit 102.

The textile-assembly toolkit 102 may include mechanical attachment features 106 matched to carefully chosen knit features (e.g., textile features 108) to produce an assembly suitable for reversibility and mass manufacturing. In aspects, the textile features 108 include purposefully-designed knit types configured to connect to one or more of the mechanical attachment features 106 to enable repeatable and reversible assembly of the textile 104 to the electronic-speaker device 100 in a manner that hides the textile features 108 and the mechanical attachment features 106. In some instances, implementation of such features leaves no visible seam, textile edge, or attachment feature on an exterior of the electronic-speaker device 100.

The mechanical attachment features 106 may include one or more of pins 110, buttons 112, hook and loop 114 material, retention rods 116, an input/output (I/O)-port ring 118, and a plastic sheet 120, or any combination thereof. The textile features 108 may include one or more of holes 122 (e.g., knit holes, cut holes) and knit structure changes 124 (e.g., different yarn, different knit stitch, different number of knitting rows), or any combination thereof. The attachment features (e.g., the mechanical attachment features 106 and the textile features 108) are selected for (i) the geometry of a rigid part onto which the textile 104 is to be assembled and (ii) the geometry of the assembly around the rigid part. Further, depending on available clearance and symmetry versus non-symmetry of the rigid part and the device assembly, different features of the textile-assembly toolkit 102 may be combined to provide appropriate attachment strength for the textile 104 to the rigid part.

For purposes of discussion, the examples described herein are directed to an electronic-speaker device 100 having a non-symmetric (about at least one axis) housing part (e.g., "neck") on which the textile 104 is mounted using the textile-assembly toolkit 102. These and other capabilities and configurations, as well as ways in which entities of FIG. 1 act and interact, are set forth in greater detail below. These entities may be further divided, combined, and so on. The electronic-speaker device 100 of FIG. 1 and the detailed illustrations of FIG. 2 through FIG. 13 illustrate some of many possible environments, devices, and components capable of employing the described techniques.

Figure 2:
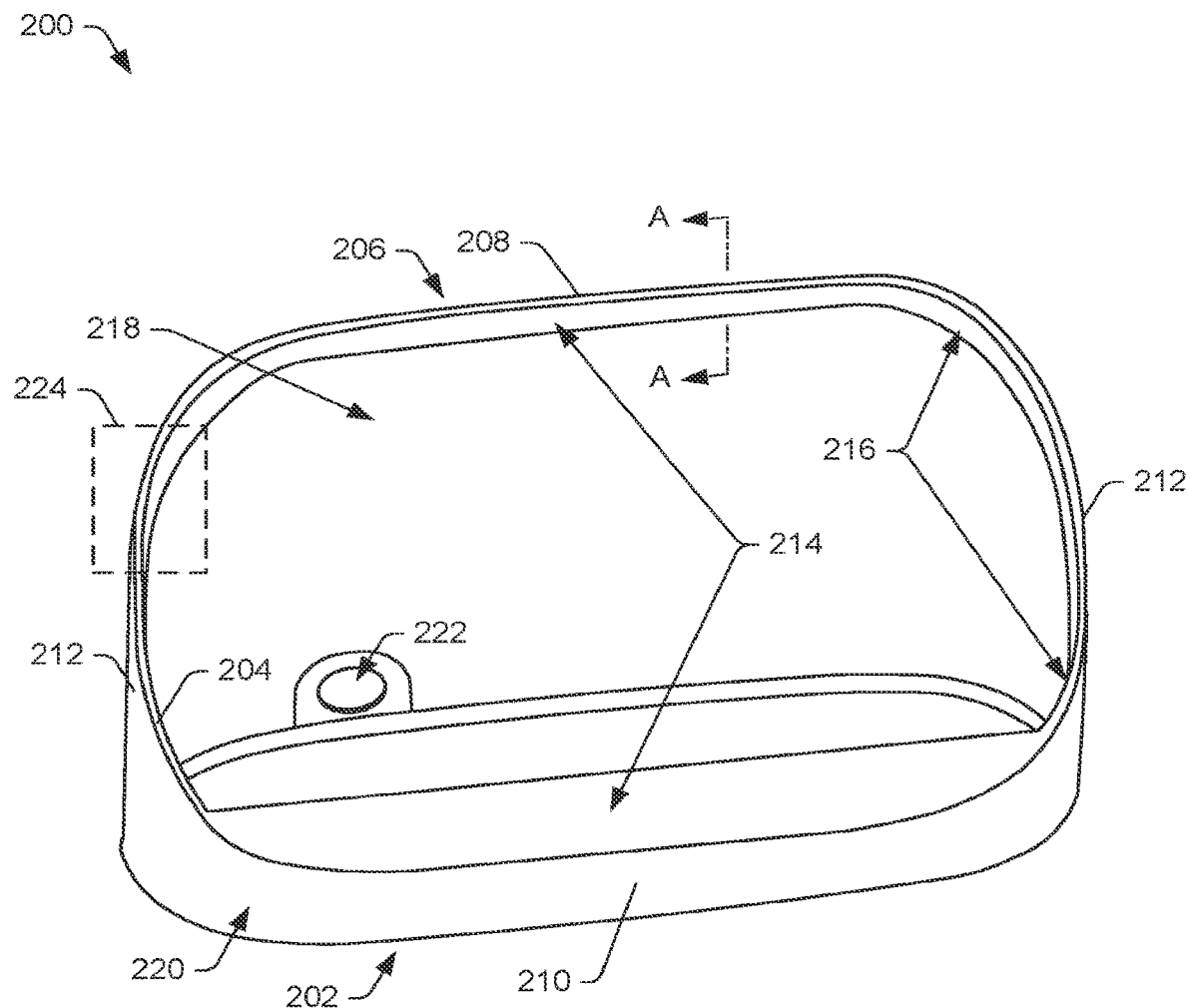
FIG. 2 illustrates an example housing part of an electronic-speaker device.

FIG. 2 illustrates a housing part 200 of an electronic-speaker device 100 (e.g., the electronic-speaker device 100-6 in FIG. 1). The housing part 200 illustrated in FIG. 2 is a shell having a base 202 for resting on a surface. In some aspects, the housing part 200 may not include the base 202 but may form a tube with two opposing openings. The housing part 200 includes walls 204 extending from the base 202 to a top 206 defining an opening opposite the base 202. In the illustrated example, the walls 204 around the opening form a frame on which a display subassembly (not shown in FIG. 2) may be mounted. The frame is formed to enable the display subassembly to be mounted at an angle in a range between 30 degrees and 90 degrees relative to a plane defined by the base 202. For example, a first side (e.g., a back wall 208) may have a greater height than an opposing second side (e.g., a front wall 210), while connecting sides (e.g., side walls 212) may have a height that transitions from the first side to the second side. Further, the walls 204 in the illustrated example include straight regions 214 and curved regions 216 (e.g., corners). Some devices may only include curved regions or only straight regions.

Due to the complex geometry of the housing part 200, a combination of different features in the textile-assembly toolkit 102 may be used to assemble the textile 104 to an interior surface 218 (and the base 202) of the housing part 200 to cover an exterior surface 220 of the housing part 200 in a way that hides the attachment features (the mechanical attachment features 106 and the textile features 108) and that maintains appropriate tension on the yarn of the textile 104 for preventing acoustic distortion caused by, e.g., rub and buzz. The housing part 200 may also include an I/O-port opening 222 for providing access to an I/O port on the electronic-speaker device 100 to connect a cable (e.g., power cable, headphone cable) to the electronic-speaker device 100.

In aspects, the textile 104 may be formed (e.g., knit) into a sleeve that can be pulled over the housing part 200, from the base 202 to the top 206 or from the top 206 to the base 202. The sleeve may have no visible seams along its body and may have an opening at one or both opposing ends of the textile sleeve. The sleeve may also have an opening for the I/O port, if present, or such an opening may be cut after textile formation. The edges of each opening may be wrapped around edges of the openings of the housing part 200 and fastened to the interior surface 218 of the housing part 200 and, in some instances, to the base 202 of the housing part 200. Covering the housing part 200 in this way leaves no visible seam or fabric edge on the exterior of the housing part 200.

Accordingly, when covering the housing part 200 with the textile 104, any suitable area(s) on the housing part 200 may be used for attachment. In this example, the primary areas for attachment include the top 206, the base 202, and the I/O-port opening 222. Various parts of the housing part 200 may be referred in FIGS. 3A-13. An example region 224 is used in some of FIGS. 3A-13 to describe different examples of attachment features in the textile-assembly toolkit 102, any of which may be combined with one or more of the others.

Example Toolkit

FIGS. 3A-13 illustrate various example attachment features (e.g., mechanical attachment features 106 and textile features 108) of the textile-assembly toolkit 102 from FIG. 1, any of which may be combined to enable reversible assembly of the textile 104 to the electronic-speaker device 100 in manner that is scalable to mass production.

Figure 3A:
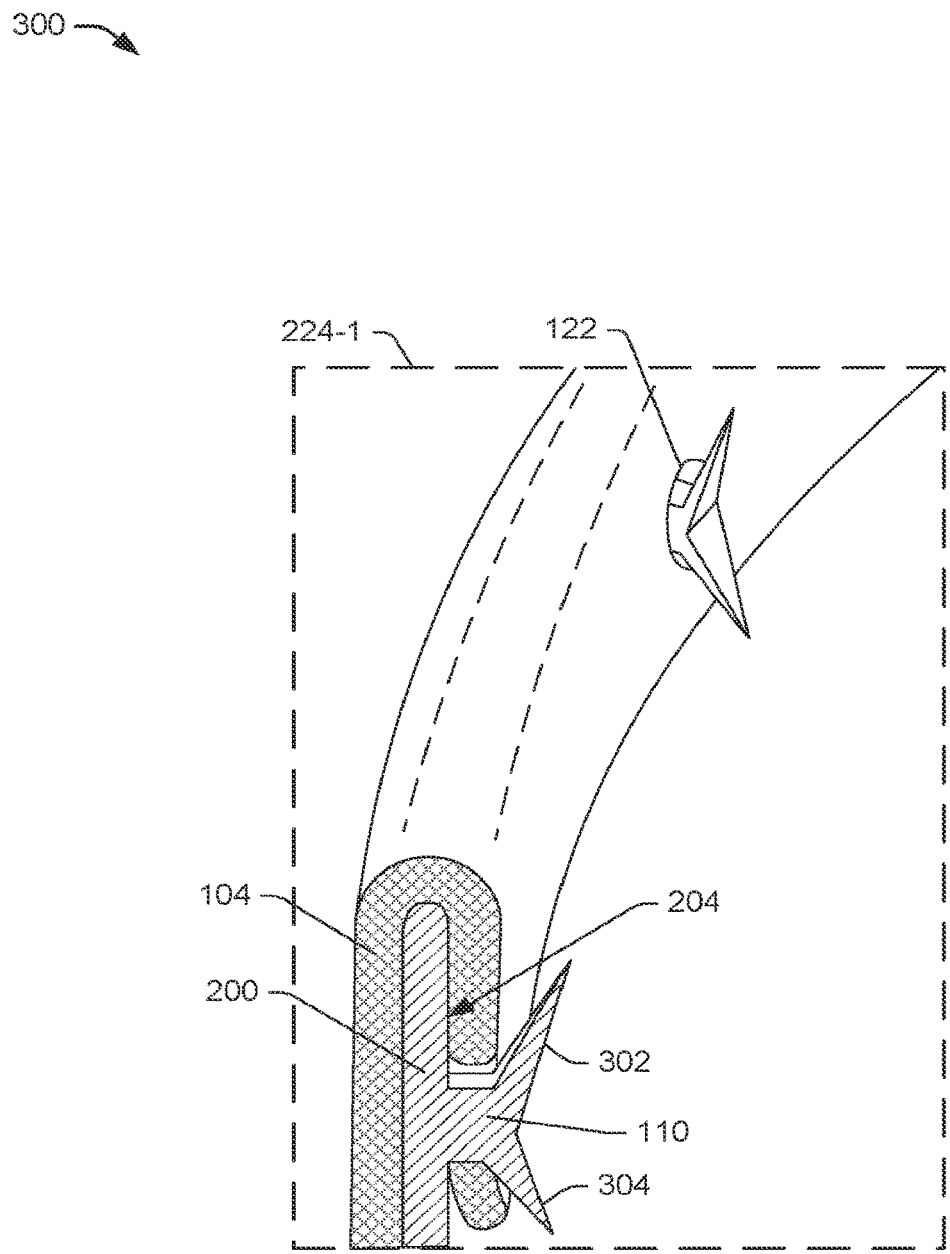
FIG. 3A illustrates an example implementation of the pins from FIG. 1.
Figure 3B:
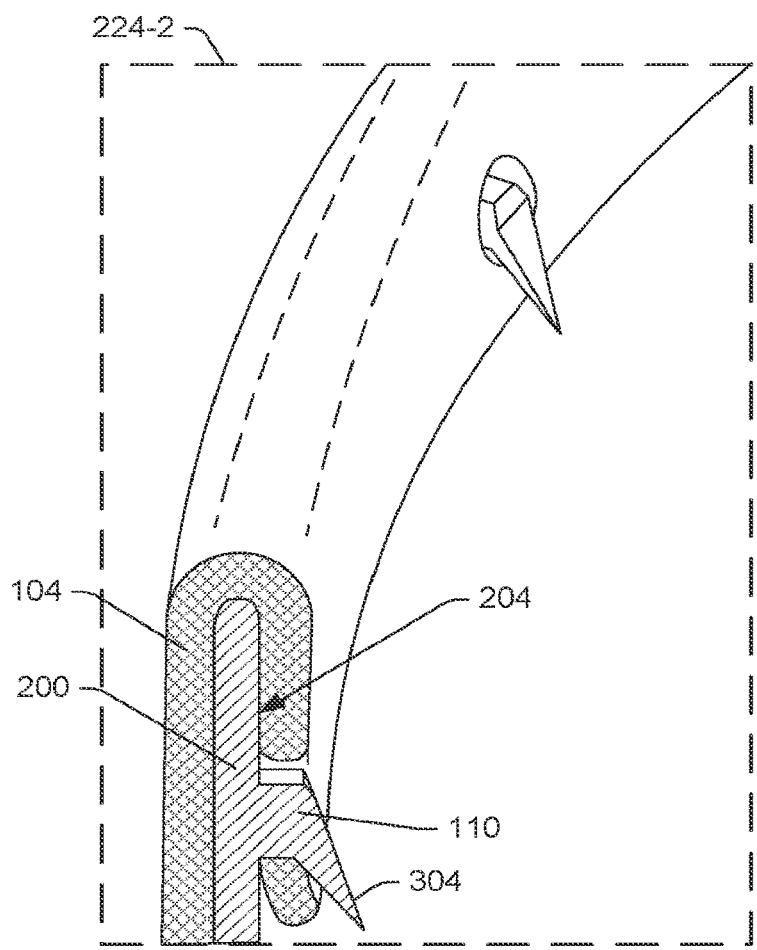
FIG. 3B illustrates another example implementation of the pins from FIG. 1.

FIG. 3A illustrates an example implementation 300 of the pins 110 from FIG. 1. FIG. 3B illustrates another example implementation 310 of the pins 110 from FIG. 1. The example implementation 300 in FIG. 3A includes an instance 224-1 of the region 224 from FIG. 2 in which a series of pins 110 are located along the interior surface 218 of a rigid part (e.g., the housing part 200). The pins 110 are configured to pierce the textile 104 or protrude through holes intentionally formed in the textile 104 and thereby secure the textile 104. Each pin 110 may be equipped with a leading pointed end (e.g., insertion feature 302), which can pierce the textile 104 or be pushed through a preformed hole (e.g., hole 122) in the textile 104 for alignment. The preformed hole 122 may be knit into the textile 104 using any suitable stitch technique, including a pointelle hole. The hole 122 may instead be a location indicated by colored yarn where the pin 110 can pierce the textile 104.

The pin 110 may also include a retention feature 304 (e.g., barb) positioned opposite the insertion feature 302. The retention feature 304 retains the textile 104 and provides an opportunity for disassembly of the textile 104 from the housing part 200. During assembly, the retention feature 304 may hook over and subsequently pierce into the textile 104 to resist textile extraction. In this way, the textile 104 may be stretched over the edge (e.g., at the top 206) of the housing part 200 and latched onto the retention features 304 by using the insertion features 302 of the pins 110 to guide the textile 104 onto the retention features 304 (e.g., by piercing the textile 104 or using the preformed holes 122).

In one example, the pins 110, including the retention features 304 and the insertion features 302, may be molded on the rigid housing part 200. Alternatively, the pins 110 may be part of a separate component that is assembled to the rigid housing part 200 or a main housing of the electronic-speaker device 100. Using the pins 110 enables alignment control of the textile 104 via designed part features, in contrast to conventional methods of using assembly fixture features, and may improve assembly repeatability in mass production.

Any suitable pitch may be used for the pins (e.g., 7 millimeters (mm), 10 mm). The pins 110 may extend from the interior surface 218 of the housing part 200 by any suitable length, including a length within a range of approximately 0.5 mm to approximately 2 mm. Additionally, the retention feature 304 may extend at any suitable angle relative to the interior surface 218 of the housing part 200, including an angle within a range from approximately 35 degrees to approximately 75 degrees. In some aspects, the holes 122 in the textile 104 may be reinforced by, for example, a hard plastic that lines the holes 122 or melted yarns in that area of the knit sleeve.

In another aspect, and as illustrated in FIG. 3B, the pin 110 may include the retention feature 304 without the insertion feature 302. For example, FIG. 3B illustrates an instance 224-2 of the region 224 from FIG. 2, in which a series of pins 110 are located along the interior surface 218 of the rigid housing part 200. Here, the pins 110 include the retention feature 304. The retention feature 304 may include any suitable shape, including the illustrated pointed shape, a hook shape, a box shape, a sphere shape, a partial sphere shape, and so forth. To help with assembly of the textile 104 when using pins 110 that do not include the insertion feature 302, the textile 104 may be reinforced around the preformed holes 122, e.g., with a plastic lining.

Using the preformed holes 122 in the textile 104, the pins 110 enable control of wrapping tightness, which results in the amount of stretch imparted on the textile 104 being dependent on the part features instead of a highly-variable textile cutting process. Also, the pins 110 enable a high retention force on the textile 104, without using a glue joint.

Figure 4:
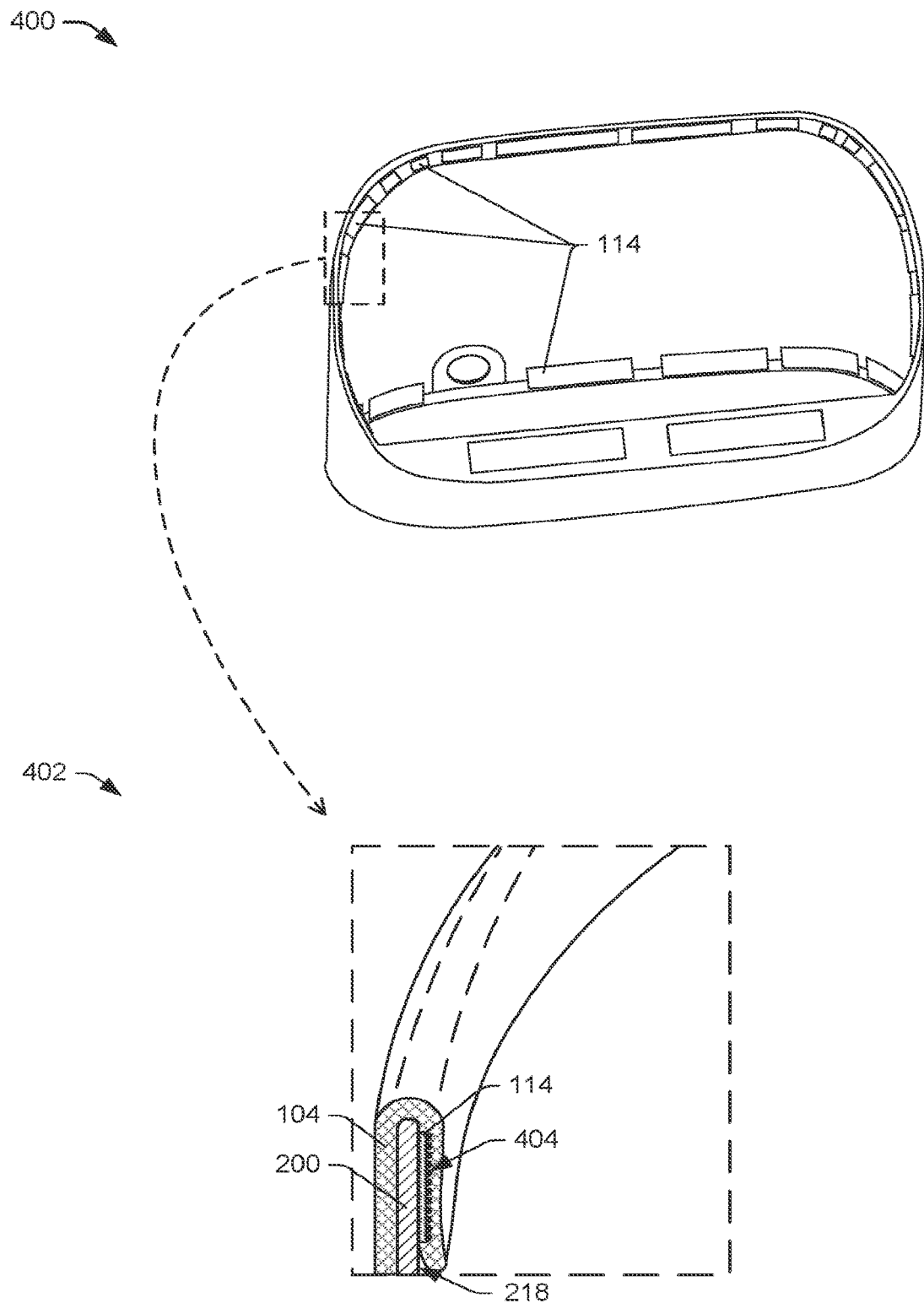
FIG. 4 illustrates a sectional view, taken along the line A-A in FIG. 2, of an example implementation of the textile features from FIG. 1 in combination with the pins from FIG. 1.

FIG. 4 illustrates an example implementation of the hook and loop 114 from FIG. 1. For example, FIG. 4 includes an instance 400 of the housing part 200 with multiple strips of hook and loop 114 material (e.g., Velcro®) positioned on the interior surface 218 of the housing part 200 around the opening at the top 206 and around the base 202. In addition, FIG. 4 shows a sectional view 402 of a portion of the housing part 200 assembled to the textile 104. The hook and loop 114 material includes an array of micro-hook features (micro-hook array 404) attached to the interior surface 218 of the housing part 200. The micro-hook features pierce into and hook onto the knit structure of the textile 104, which acts as the loop side of a hook-and-loop connection. Assembly includes placing the textile 104 over the micro-hook array 404 and applying pressure.

The micro-hook array 404 may be molded onto the housing part 200 or assembled as a separate component to the housing part 200. For example, the micro-hook array 404 may be overmolded, assembled via pressure sensitive adhesive (PSA), or retained with mechanical features. The hook and loop textile retention method allows for extreme ease in disassembly and reassembly with reasonable retention force, which may enable engineering teams to quickly swap textile types for testing or system debugging.

The matching knit feature may be a structure and yarn combination that provides high attachment strength to the micro-hook features. In addition, holes (e.g., pointelle holes) may be included to loop over temporary pins in a fixture that aligns the textile 104 to the housing part 200 during assembly.

The hook and loop 114 features may be useful for attaching the textile 104 to the housing part 200 in areas of the assembly that have a low profile. Further, the hook and loop 114 features may be used for knit geometries (e.g., flat textiles) that are thin in profile (e.g., 0.65 mm or less). Also, the hook and loop 114 features enable easy disassembly for rework, such as quick swapping of textiles for rework.

Figure 5:
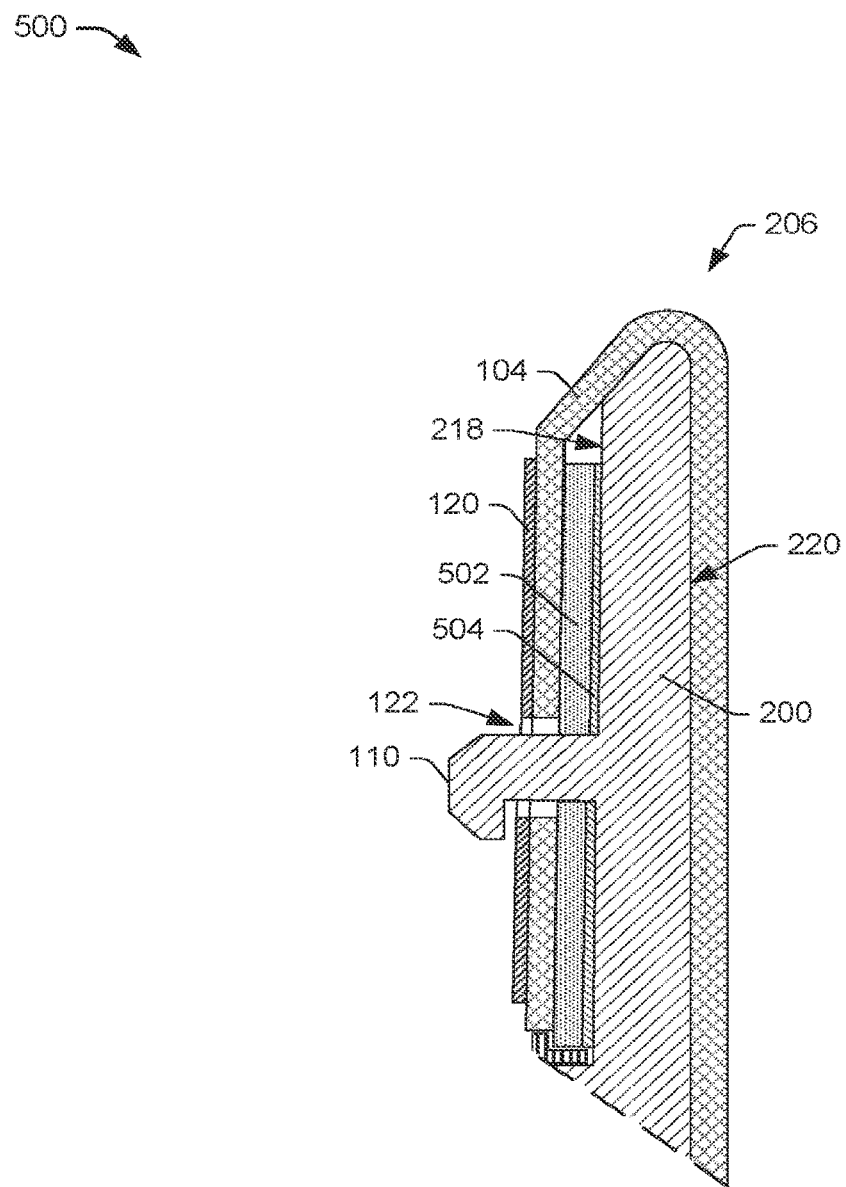
FIG. 5 illustrates an example implementation of the hook and loop from FIG. 1.

FIG. 5 illustrates a sectional view 500, taken along the line A-A in FIG. 2, of an example implementation of some of the textile features 108 from FIG. 1 in combination with the pins 110 from FIG. 1. The sectional view 500 is a view of the top 206 of the back wall 208 of the housing part 200 assembled to the textile 104. As illustrated, the textile 104 is wrapped around the top 206 edge of the rigid housing part 200 from the exterior surface 220 toward the interior surface 218. The textile 104 is latched onto one or more pins 110 (e.g., hooks) to retain the textile 104 to the housing part 200.

To increase the stiffness of the textile 104 and assist with engaging the pin 110, a rigid material (e.g., plastic sheet) may be welded to the textile 104 (e.g., melted together with the fabric of the textile 104 via a welding technique such as ultrasonic welding, laser welding, heat and pressure, etc.). For example, a plastic sheet 120 (e.g., a polyethylene terephthalate (PET) sheet) is attached to the textile 104 proximate to the edges of the textile 104 and around the hole 122. In one example, the plastic sheet 120 can be implemented in multiple separate pieces around the opening of the housing part 200. In another example, the plastic sheet 120 can run continuously around the opening (e.g., on the walls 204 around the opening). The plastic sheet 120 may include a polymer resin to substantially match the material of the textile 104 to improve connection during welding and maintain a monomaterial assembly for later recycling. Similarly, another plastic sheet 120 and button 112 can also be welded to the bottom edge of the textile 104. The plastic sheet 120 acts as a retention component to rigidize the textile 104 proximate to its edge and allow consistent alignment of a cosmetic pattern on the textile 104 to the housing part 200 and ease of assembly. Alternatively to the PET sheet, "low-melt" yarns may be included in the edges of the knit and used to partially fuse that area of the knit.

In some aspects, a strip of hook material 502 (e.g., portion of hook and loop 114 having the micro-hook array 404) can be used to help secure the textile 104 in place. For example, the strip of hook material 502 can be cut to fit the features of the housing part 200 and attached to the housing part 200 via a PSA 504. The textile 104 with the plastic sheet 120 is assembled to the pins 110 on the housing part 200 and pressed onto the hook material 502 to interlock the hook material 502 with the fibers of the textile 104. In this way, the rigid pins 110 provide alignment in combination with retention via the hook material 502, particularly in areas with limited space between other parts that assemble to the housing part 200 and necessitate a low-profile attachment as well as accurate alignment of textile pattern to long edges of the electronic speaker device 100 that are visible to a user.

Figure 6:
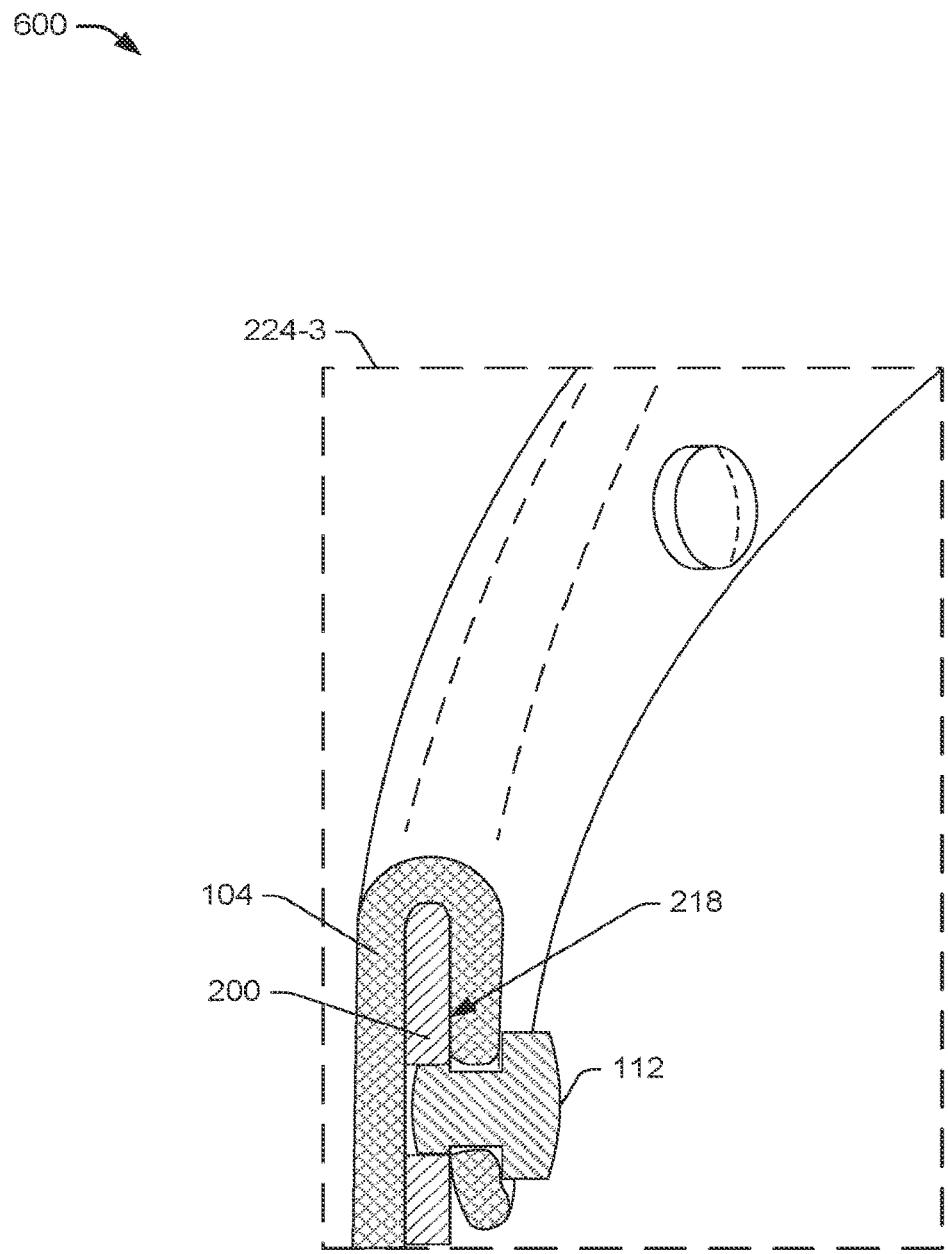
FIG. 6 illustrates an example implementation of the buttons from FIG. 1.

FIG. 6 illustrates an example implementation 600 of the buttons 112 from FIG. 1. In particular, FIG. 6 shows a sectional view of an instance 224-3 of the region 224 from FIG. 2, in which buttons are used to secure the textile 104 to the rigid housing part 200. Any suitable button 112 can be used, including a metal button or a plastic button that matches the fabric chemistry of the textile 104. In one example, the buttons 112 are overmolded. In another example, the buttons 112 are welded to the textile 104 via laser welding or ultrasonic welding. The button 112 may include a single element that is press fit into a hole or recess in the rigid housing part 200. The button 112 may alternatively include two elements (e.g., male and female) that fit (e.g., snap) together, with one element attached to the housing part 200 and the other element attached to the textile 104. Any combination of different buttons 112 may be used. Similar to the pins 110 described above, the buttons 112 may be located along the interior surface 218 of the housing part 200, including proximate to the top 206 edge (e.g., opening) and/or proximate the base 202 (e.g., around the bottom of the walls 204). In some aspects, one or more of the buttons 112 may be located on a bottom surface of the base 202 (e.g., a base plate) that connects or assembles to the bottom of the walls 204.

Figure 7A:
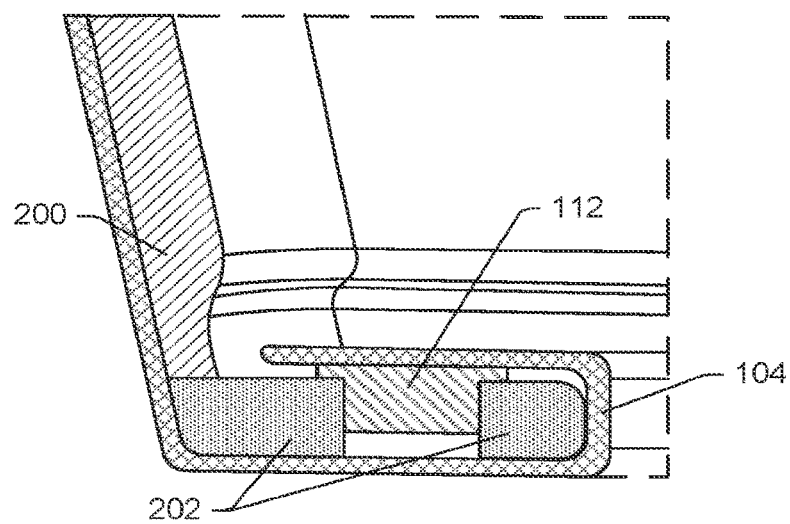
FIGS. 7A and 7B illustrate sectional views of an example implementation of the button from FIG. 1 implemented on the base of the housing part from FIG. 2.
Figure 7B:
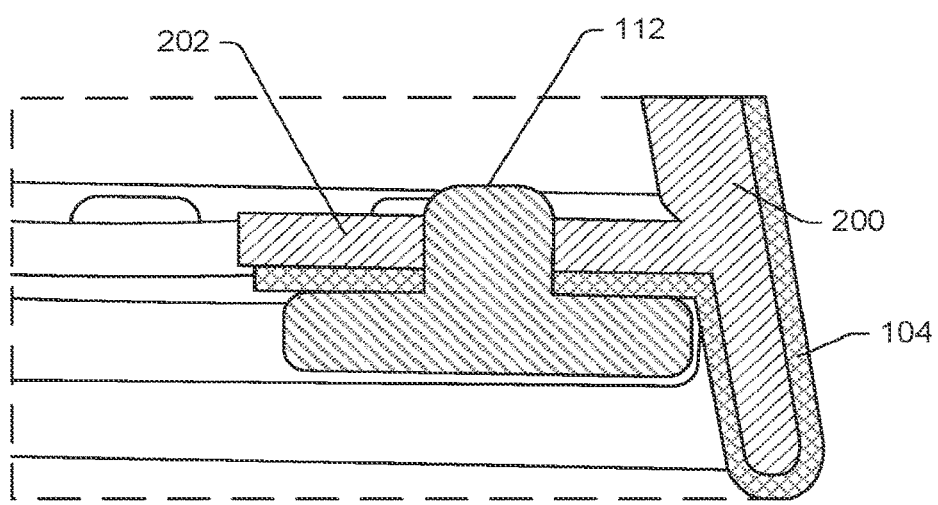

FIGS. 7A and 7B illustrate sectional views 700 and 710, respectively, of an example implementation of the button 112 from FIG. 1 implemented on the base 202. The sectional view 700, shown in FIG. 7A, applies the button 112 on the interior of the base 202. The sectional view 710, shown in FIG. 7B, applies the button 112 on the exterior of the base 202. In either case, the button 112 may be any suitable button. The textile 104 is wrapped onto the base 202 (e.g., a flat base plate) in the illustrated example due to limited space under a front grille of the electronic-speaker device 100 that prevents the textile 104 from being easily wrapped inside, as on the top. In some aspects, the button 112 may be attached to a bottom surface of a speaker driver assembled within the housing part 200, rather than to the base 202 of the housing part 200.

The bottom area of the textile 104 may likely be under significant tension. Accordingly, buttons 112 may be used instead of, or in addition to, hook and loop 114. In one example, the button 112 is ultrasonically welded onto the textile 104 together with a PET sheet, where the PET sheet provides stress distribution (similar to the description of FIG. 4) and maintains equal stretching of the textile 104 along the racetrack-like geometry of the textile 104. In this example, when assembled, the button 112 may rely on hoop stress in the hole and friction to remain in position and retain the textile 104 to the base 202.

In one example, the button 112 may have a ring or disk with one or more pointed extensions (e.g., spikes) (not shown) that pierce through the textile 104 and into the hole 122. The pointed extensions may then fit in compression against the walls of the hole 122 in the housing part 200 or a hole in the base 202. In this way, the button 112 is not permanently attached to the textile 104. For example, the button 112 passes partially through the textile 104 and uses friction to remain in the hole 122 but the button 112 is still removable with sufficient force without causing damage to the textile 104, the base 202, or the housing part 200. When assembled, the pointed extensions may slightly deform as they bias against the sides of the hole to help secure the button 112 in place.

The buttons 112 in FIGS. 7A and 7B may be attached (e.g., welded) to the textile 104. Alternatively, the button 112 in FIG. 7B may pierce the textile 104 and then fit into the hole in the base 202. The textile 104 may, in some cases, also include a PET sheet (not shown) positioned between the textile 104 and the base 202 (or on an opposing side of the textile 104 from the base 202) to reinforce the connection and help maintain the desired tension on the textile 104.

The buttons 112 provide a reliable attachment and retention mechanism, with high alignment accuracy. The buttons 112 can be used with minimal distortion to the textile 104.

Figure 8:
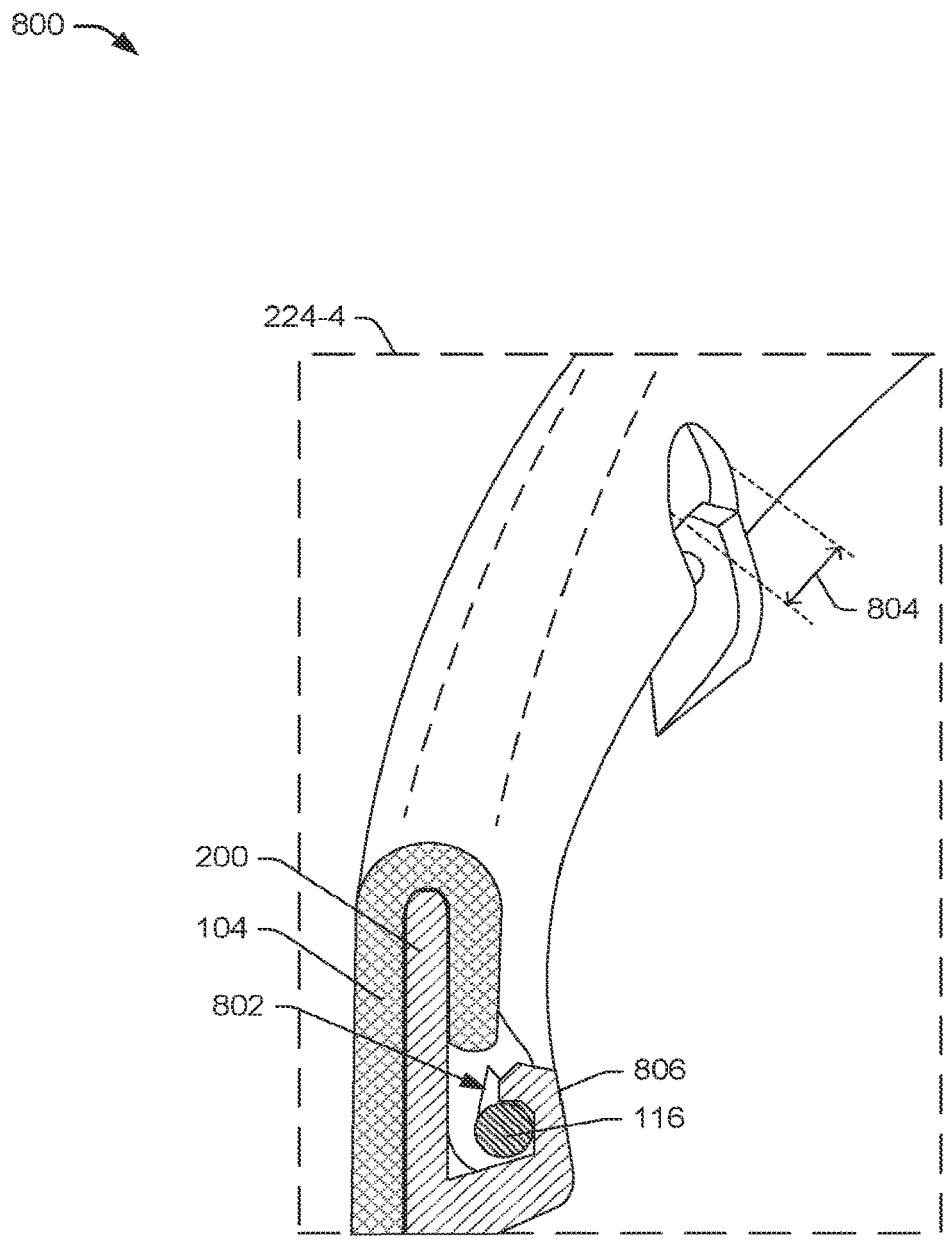
FIG. 8 illustrates a sectional view of an example implementation of the retention rod from FIG. 1.

FIG. 8 illustrates an example sectional view 800 of the retention rod 116 from FIG. 1. In particular, the example sectional view 800 in FIG. 8 includes an instance 224-4 of the region 224 from FIG. 2, in which the retention rod 116 is used to secure the textile 104 to the rigid housing part 200. The edges of the opening in the textile 104 may be rolled down and stitched or bonded to form a tube (e.g., tube 802) or a series of close-spaced holes formed along the edge of the textile sleeve. The tube 802 may be formed in sections separated by one or more gaps (e.g., gap 804). The tube 802 is configured to support a rigid bar (e.g., the retention rod 116) positioned within the tube 802. For example, the retention rod 116 may be inserted into the tube 802 to enable the retention rod 116 to exert an evenly-distributed tension force (e.g., pull) on the edge of the textile sleeve. In another example, a thin plastic sheet with holes or a rod can be molded or welded onto the edge of the textile sleeve.

The retention rod 116 (or the thin plastic sheet) may then be captured by hook features (e.g., hooks 806 or pins 110 from FIGS. 3A and 3B) attached to the interior surface of the housing part 200. The hooks 806 capture the retention rod 116 where the retention rod 116 is exposed in the gap 804. In the illustrated example, the hooks 806 are upward-facing hooks. Alternatively, downward-facing hooks may be implemented. The textile 104 is stretched over the edge of the housing part 200 and the hooks 806 capture the retention rod 116 to secure the textile 104 in place.

Due to the retention rod 116 being a rigid feature, the retention rod 116 may provide highly accurate alignment in areas where the textile 104 is to be constrained in multiple directions simultaneously, including in non-straight areas (e.g., corners and curved areas). Further, the retention rod 116 enables a connection with a predictable strain on the textile 104 and ease of aligning the textile 104 to a long edge of the housing part 200, with substantially no bowing between attachment points due to the retention rod 116 distributing stress evenly into the textile 104. To reduce production costs, the retention rod 116 may be implemented in the corner areas of the housing part 200 while the hook and loop 114 material may be implemented in the flat straight areas.

In an example, the textile 104 can be rigidized through selection of special yarns and structure at the edges (e.g., around the opening of the sleeve) of the textile 104. For example, fusible yarns may be inlaid in the terminal courses (e.g., end rows of knitting) and then heated to make a less-flexible area that distributes stress more evenly. In another example, the last several courses may carry inlaid high-diameter monofilament yarns to similarly rigidize the textile 104. In yet another example, smaller monofilaments may be twisted with fusible yarns to make a heavy bundle and then inlaid in the last several courses, which may result in the structure being more flexible than the equivalent monofilament to ease knitting. After completion, the fusible yarn can be melted to hold the smaller filaments together and effectively make a single filament that behaves like a rigid rod in the edge of the textile sleeve and can be hooked onto or pulled by a fixture during assembly.

Figure 9:
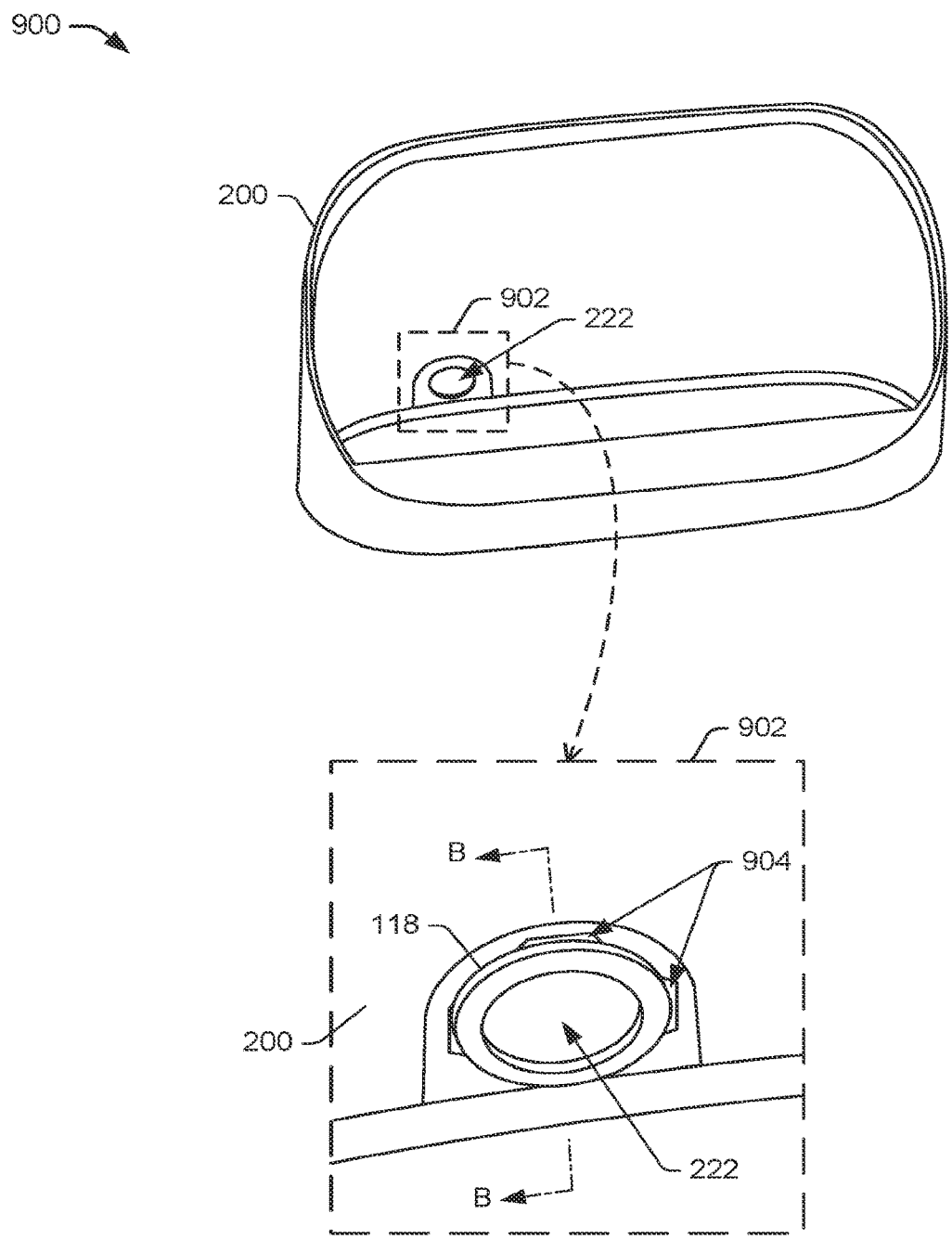
FIG. 9 illustrates an example implementation of the I/O-port ring from FIG. 1.

FIG. 9 illustrates an example implementation 900 of the I/O-port ring 118 from FIG. 1. An enlarged view 902 of the I/O-port opening 222 is illustrated with the I/O-port ring 118 assembled to the housing part 200. The opening (e.g., the I/O-port opening 222) in the housing part 200 may be used for providing access for a connector to connect a cable (e.g., power cable, headphone cable) to an I/O port of the electronic-speaker device 100. As described in further detail below, the I/O-port ring 118 overlaps a portion (e.g., edges) of the textile 104, presses the edges of the textile 104 into slots 904 in the housing part 200, and snaps or press fits into the housing part 200 to retain the textile 104 in position around the I/O-port opening 222.

The I/O-port ring 118 enables quick assembly and disassembly, due to its friction-fit method of assembly. As mentioned, the I/O-port ring 118 enables a high fabric-retaining force to retain the textile 104 in its position proximate to the I/O-port opening 222. For example, a portion of the textile 104 is extended through the I/O-port opening 222 from the exterior of the housing part 200, such that the portion of the textile 104 wraps around the edge of the I/O-port opening 222 toward the interior surface 218 of the housing part 200. The housing part 200 includes several recesses (e.g., the slots 904), over which the edges of the textile 104 are placed. The slots 904 are configured to receive extensions on the I/O-port ring 118, which force the edges of the textile 104 into the slots 904 to retain the textile 104 in position. In this way, the edges of the I/O-port opening 222 are wrapped in fabric, leaving no visible fabric edge or attachment feature on the exterior on the electronic speaker device 100.

Further, the FO-port ring 118 enables high design flexibility. For example, the geometry of the I/O-port ring 118 can be optimized for fit. Due to its low profile, the I/O-port ring 118 causes minimal impact to a barrel jack trim of the electronic-speaker device 100.

Figure 10A:
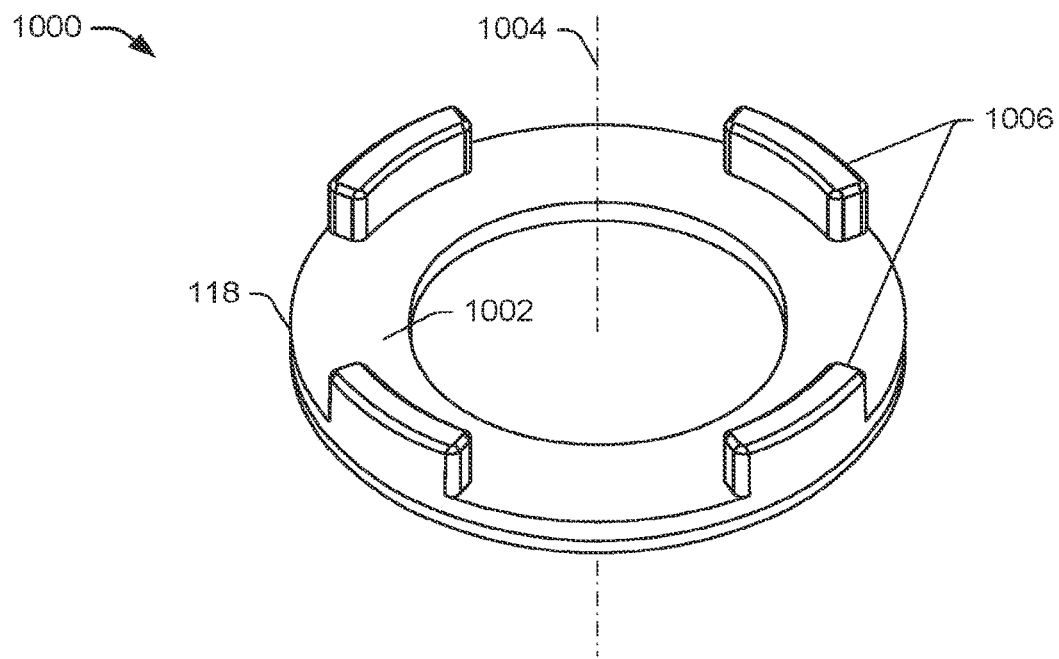
FIG. 10A illustrates a bottom view of the I/O-port ring from FIG. 9.
Figure 10B:
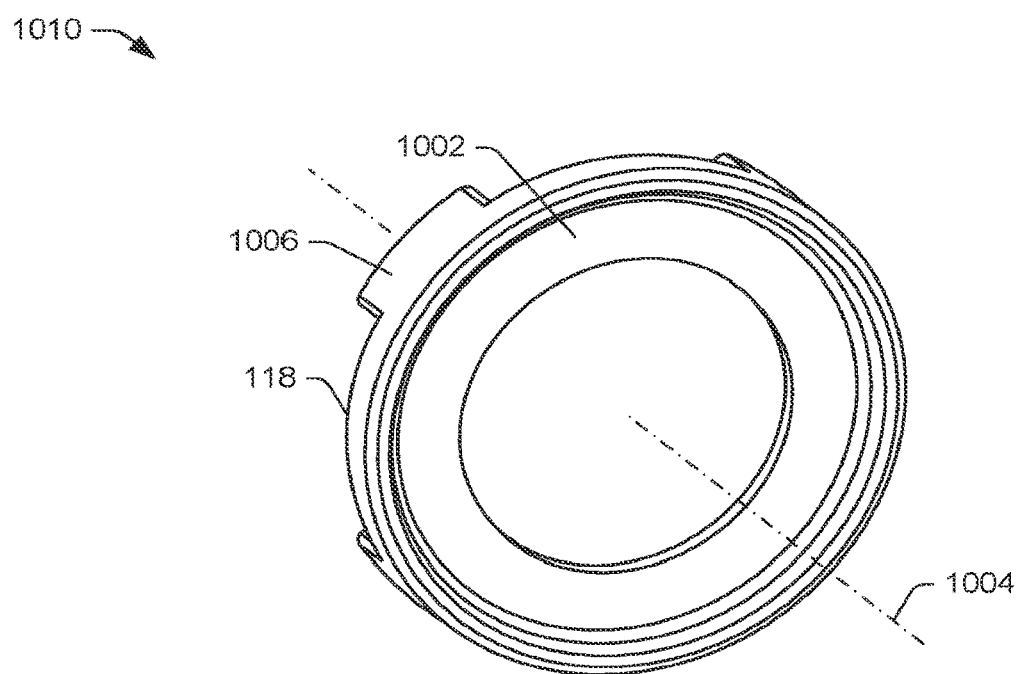
FIG. 10B illustrates a top view of the I/O-port ring from FIG. 9.

FIG. 10A illustrates a bottom view 1000 of the FO-port ring 118. FIG. 10B illustrates a top view 1010 of the I/O-port ring 118. In the illustrated example, the I/O-port ring 118 includes a body 1002 having a ring-like shape around a center axis 1004. On one side (e.g., bottom side) of the body 1002, the I/O-port ring 118 includes multiple extensions (e.g., extensions 1006), which may be ribs, rods, cones, or any other suitable structure.

Figure 11:
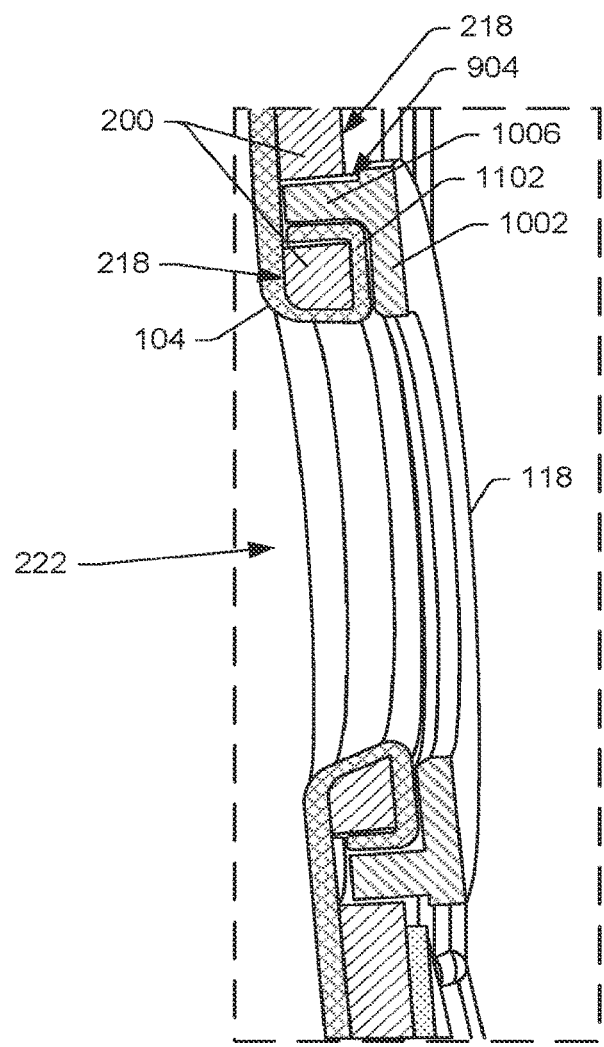
FIG. 11 illustrates a sectional view of the I/O-port ring assembled to the housing part, taken from line B-B in FIG. 9.

Consider now FIG. 11, which illustrates a sectional view 1100 of the FO-port ring 118 assembled to the housing part 200, taken from line B-B in FIG. 9. As illustrated, the FO-port ring 118 is aligned with the I/O-port opening 222 in the housing part 200. The textile 104 is wrapped around the edges of the FO-port opening 222 from the exterior surface 220 of the housing part 200 to the interior surface 218 of the housing part 200. The textile 104 includes flaps (e.g., textile flaps 1102) that overlap the interior surface 218 of the housing part 200. The textile flaps 1102 are removably secured (e.g., pressed) in the slots 904 in the housing part 200 by the extensions 1006 on the I/O-port ring 118. In addition, a portion of the textile flaps 1102 is compressed against the interior surface 218 of the housing part 200 by the body 1002 of the I/O-port ring 118, which helps secure the textile 104 in position around the FO-port opening 222. The I/O-port ring 118 snaps or press fits into the slots 904 to secure its position and retain the textile 104 in position.

The textile 104 may have a matching knit feature corresponding to the I/O-port ring 118. For example, the textile feature 108 to match the I/O-port ring 118 may have a knit structure change 124 including a dimple (or bulge) made by "goring" or "partial knitting" to provide additional fabric locally to be wrapped inside the I/O-port opening 222. Additionally, switching to a single jersey knit structure from the more complex (cosmetically-determined) knit structure on the main knit body of the textile 104 may be useful to provide a denser area of fabric. The denser single jersey may be more consistent to cut and then wrap than a structure with larger, more widely-spaced holes. The dimple (or bulge) made in the textile 104 may be cut to create a hole, which enables the textile flaps 1102 to be wrapped around the edges of the I/O-port opening 222 toward the interior surface 218 of the housing part 200.

Although the examples described herein are directed to a neck topology of the housing part 200, other topologies may also be used. For example, the housing part 200 may include a dish topology (e.g., essentially forming a substantially symmetric dish-like shape). For a dish-topology speaker, a different combination of the mechanical attachment features 106 and textile features 108 of the textile-assembly toolkit 102 may be implemented. For example, such a device may not include a port requiring the I/O-port opening 222 and the device may include a single edge around an opening that is radially symmetric. Accordingly, a single attachment type may be merited. If the device has a small form factor, the attachment type with the least surface area and volume may be selected and implemented. However, the textile 104 may experience greater strain in deeper curves of a dish-topology housing part than on a neck-topology housing part. Therefore, using a retention mechanism (e.g., retention rod 116 or a plastic sheet 120 welded to the textile 104) may help rigidize the edges of the textile 104 and evenly distribute the strain on the textile 104.

In another example, rather than using a neck-topology housing part or a dish-topology housing part, the textile 104 and other cosmetic housing parts of the electronic-speaker device 100 may be attached directly to the speaker module of the electronic-speaker device 100. Such an assembly may reduce material costs and increase an available volume usable as a speaker back volume.

Example Textile Features

Figure 12:
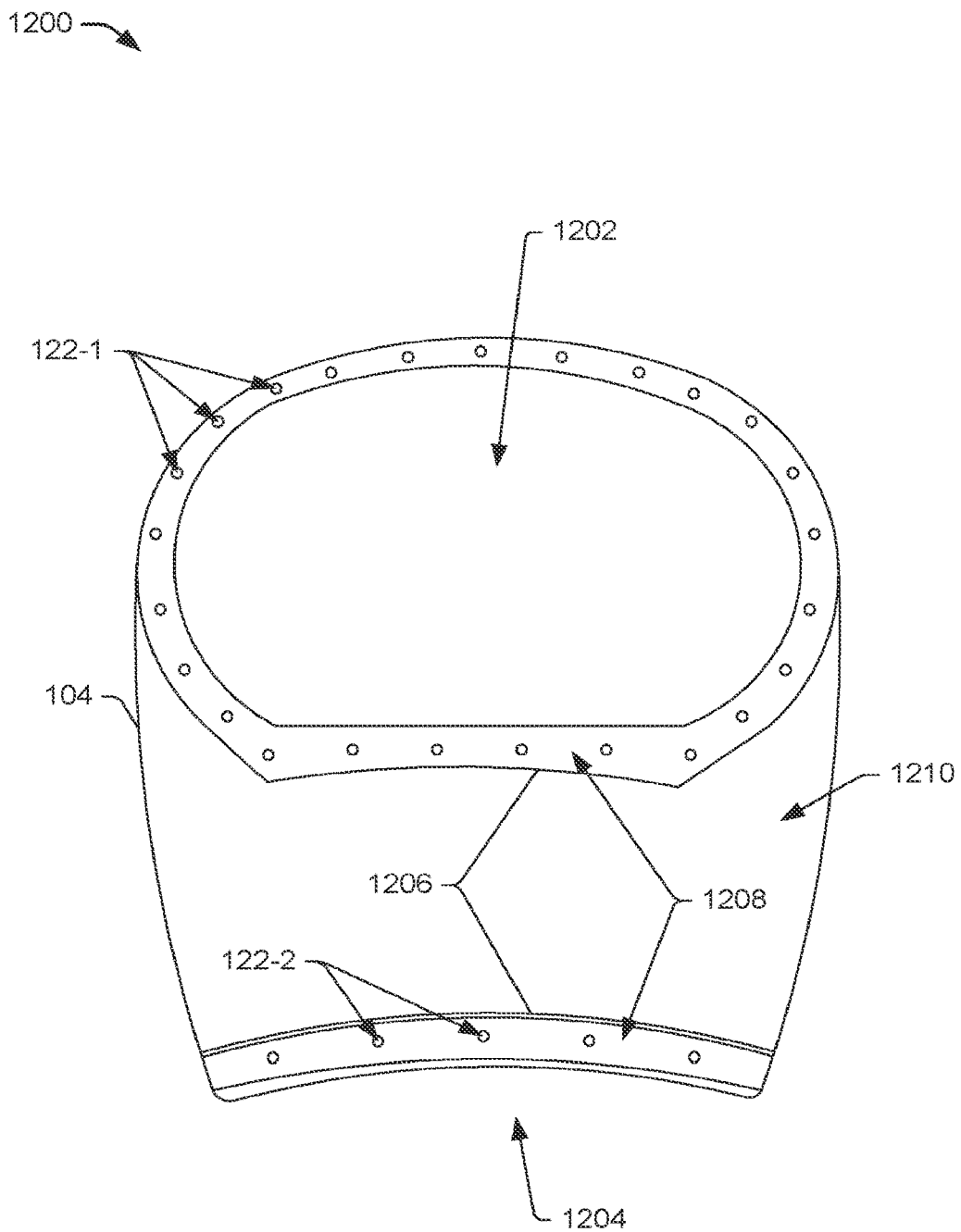
FIG. 12 illustrates a front view of an example implementation of the textile from FIG. 1.
Figure 13:
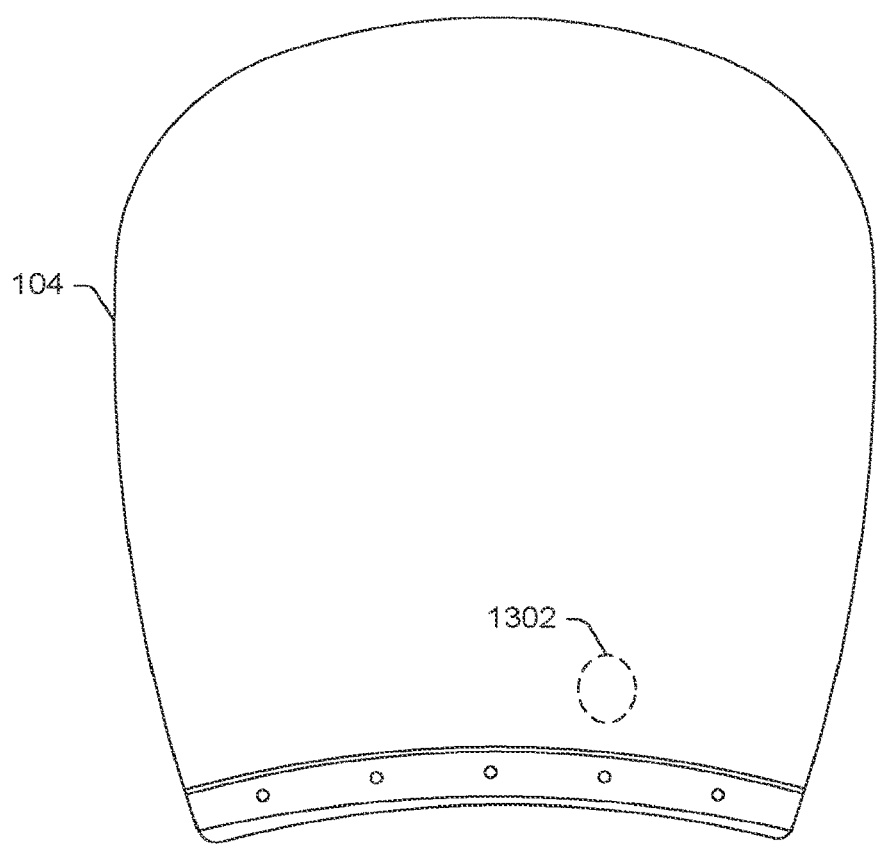
FIG. 13 illustrates a back view of an example implementation of the textile from FIG. 12.

FIGS. 12 and 13 describe examples of the textile features 108 from FIG. 1. The examples described herein illustrate how system considerations (e.g., limited attachment area, alignment to long straight edges) can drive selection of particular attachment features from the textile-assembly toolkit 102 for specific areas of a device.

FIG. 12 illustrates a front view 1200 of the example textile 104 from FIG. 1. FIG. 13 illustrates a back view 1300 of the example textile 104 from FIG. 12. The textile 104 may be knit using any suitable knitting technique. For mass production, the textile 104 may be knit using a knitting machine. In the example shown in FIG. 12, the textile 104 is knit into a textile sleeve, having a top opening 1202 and a bottom opening 1204. The textile sleeve may be knit on a flatbed knitting machine with alignment holes (e.g., holes 122-1 and 122-2, which are instances of the holes 122 in FIG. 1) made via a particular stitch type (e.g., pointelle stitch) proximate to the edges of the top and bottom openings 1202 and 1204, respectively, of the sleeve. In this way, the sleeve comes off the knitting machine with the textile features 108 premade.

The holes 122-1 may be used to temporarily hook the textile sleeve to a fixture that secures the textile sleeve at the correct tension force before pressing the fabric onto hooks (e.g., the hook material 502) that are bonded to, welded to, or molded into a rigid housing (e.g., the housing part 200). Some of the holes 122-1 in the textile 104 may be used for direct assembly to the pins 110 on the housing part 200 or for aligning the textile 104 to a jig. Along the top opening of the textile sleeve, the knit structure of the textile 104 is selected to achieve high peel force from the hook material 502.

A visual reference line (e.g., knit line 1206) may be knit into the textile 104 with a different color by, for example, changing the knit stitch at the boundary between an area 1208 designated to attach with the hook material 502 and an area 1210 designated to be the outside cosmetic surface of the electronic-speaker device 100. In another example, the knit line 1206 may be printed on the textile 104. The knit line 1206 may be used to determine whether the textile 104 has been assembled at the correct length and position. If the knit line 1206 is visible on the exterior of the electronic-speaker device 100, then the textile 104 may require reassembly.

The holes 122-2 (e.g., pointelle holes) may be included along the edge of the bottom opening 1204 of the textile 104 to indicate where to assemble the buttons 112 to the textile 104. In some cases, the holes 122-2 may be used to assemble the textile sleeve to a jig rather than the buttons 112. As described herein, the buttons 112 may be injection molded plastic and molded directly onto the textile 104, ultrasonically welded, or heat staked to the textile 104. In an example, the holes 122-2 may hold the textile 104 in a proper position and orientation on a fixture as the buttons 112 are attached to the textile 104.

Referring to FIG. 13, the textile 104 includes an area 1302 corresponding to the I/O-port opening 222 in the housing part 200 shown in FIG. 2. This area 1302 may include a knit structure change (e.g., partial knitting or goring), which creates more fabric in a local area. One example includes changing the kit structure to a single jersey stitch and adding additional short rows of knitting to create a bulge of dense fabric. The bulge provides more fabric to push through the I/O-port opening 222 so the fabric can be anchored. The bulge may be hot cut or laser cut (e.g., in an X or cross cut) to result in four flaps of fabric that can be folded into the I/O-port opening 222 and captured with the extensions 1006 on the I/O-port ring 118 that is assembled inside the housing part 200. Any suitable shape can be cut into the area 1302 to enable the textile 104 to wrap around the edges of the I/O-port opening 222. The change in knit structure creates additional surface area that can be wrapped inside the I/O-port opening 222 without distorting the textile's cosmetic pattern on the exterior of the housing part 200 all while providing sufficient tension to retain the textile 104. In another example, a finished buttonhole may be created in the area 1302 by the knitting machine. Creating a buttonhole may, however, increase knitting time and risk knitting defects, which result in higher mass-production costs.

In some cases, the textile 104 may be produced using an open-width knit material (from circular-knitting machines, warp-knitting machines, or weaving looms) that is cut to shape and then stitched, linked, bonded, or welded to itself, creating seams in the textile 104. After an appropriate shape of the textile 104 is complete, edge treatments can be made as described above to removably attach the textile 104 to rigid parts. Using the techniques described herein, however, may produce a seamless textile assembly that is assembled to the housing part 200 with highly-accurate alignment in a way that is repeatable, mass-producible, and reversible.

CONCLUSION

Although aspects of the textile-assembly toolkit for reversible assembly of a textile to an electronic-speaker device have been described in language specific to features and/or methods, the subject of the appended claims is not necessarily limited to the specific features or methods described. Rather, the specific features and methods are disclosed as example implementations of the textile-assembly toolkit for reversible assembly of a textile to an electronic-speaker device, and other equivalent features and methods are intended to be within the scope of the appended claims. Further, various different aspects are described, and it is to be appreciated that each described aspect can be implemented independently or in connection with one or more other described aspects.

What is claimed is:

1. An electronic-speaker device comprising:
a housing part forming a shell having opposing exterior and interior surfaces and at least one opening;

a textile reversibly assembled to the housing part effective to cover the exterior surface of the housing part and wrap around edges of the at least one opening;
a plurality of mechanical attachment features configured for reversible assembly of the textile to the housing part; and
a plurality of textile features configured to removably attach the textile to the plurality of mechanical attachment features to align and secure the textile to the housing part with a tension force sufficient to reduce acoustic distortion resulting from a vibration of the textile when exposed to acoustic pressure.

2. The electronic-speaker device of claim 1, wherein:
the plurality of mechanical attachment features include pins attached to the interior surface of the housing part and proximate to the at least one opening; and
the plurality of textile features include knit holes usable to latch the textile onto the pins.

3. The electronic-speaker device of claim 2, wherein the plurality of mechanical attachment features include a polyethylene terephthalate (PET) sheet attached to the textile around the knit holes to rigidize a portion of the textile proximate to an edge of the textile.

4. The electronic-speaker device of claim 3, wherein:
the plurality of mechanical attachment features include a hook material having a micro-hook array configured to interlock with fibers of the textile;
the hook material is attached to the interior surface of the housing part via a pressure sensitive adhesive; and
the PET sheet is positioned on an opposite side of the textile from the hook material.

5. The electronic-speaker device of claim 2, wherein a respective pin includes a retention feature configured to pierce into the textile, retain the textile, and enable disassembly of the textile from the housing part.

6. The electronic-speaker device of claim 5, wherein:
the respective pin includes an insertion feature positioned opposite the retention feature; and
the insertion feature is configured to pierce the textile or be inserted through a respective knit hole in the textile for alignment.

7. The electronic-speaker device of claim 1, wherein:
the mechanical attachment features include buttons positioned proximate to an edge of the textile;
the textile is wrapped around a bottom edge of the housing part;
the buttons are removably attached to a base of the electronic-speaker device; and
the base includes one or more holes each configured to receive a respective button.

8. The electronic-speaker device of claim 7, wherein the buttons are ultrasonically welded onto the textile together with one or more polyethylene terephthalate (PET) sheets, the PET sheets providing stress distribution.

9. The electronic-speaker device of claim 8, wherein the respective button includes a ring with one or more pointed extensions configured to pierce through the textile and extend into a corresponding hole in the base.

10. The electronic-speaker device of claim 1, wherein:
the plurality of textile features include an edge of the textile formed into a tube configured to support a retention rod;
the plurality of mechanical attachment features include multiple hooks configured to receive and secure the retention rod proximate to the interior surface of the housing part; and
the retention rod is configured to exert an evenly-distributed tension force on the textile.

11. The electronic-speaker device of claim 1, wherein:
the housing part includes an input/output (I/O) port opening corresponding to an I/O port of the electronic-speaker device;
the housing part includes multiple slots around the I/O-port opening;
the textile features include multiple textile flaps that wrap around edges of the I/O-port opening from the exterior surface of the housing part to the interior surface of the housing part and overlap the multiple slots; and
the plurality of mechanical attachment features include an PO-port ring having a body with multiple extensions configured to extend into the multiple slots around the I/O opening, the multiple extensions configured to press the multiple textile flaps into the multiple slots and removably secure the multiple textile flaps within the multiple slots.

12. The electronic-speaker device of claim 11, wherein:
the plurality of textile features include a region having a knit structure change forming a dimple in the textile by goring or partial knitting to provide additional fabric to locally wrap inside the I/O-port opening; and
the dimple is cut to form the multiple textile flaps.

13. The electronic-speaker device of claim 12, wherein the I/O-port ring is snapped or press fit into the multiple slots to retain the textile in position around the I/O-port opening.

14. The electronic-speaker device of claim 1, wherein the housing part is non-symmetric about at least one axis.

15. The electronic-speaker device of claim 1, wherein, when the electronic-speaker device is assembled, the plurality of mechanical attachment features and the plurality of textile features are hidden.

16. The electronic-speaker device of claim 1, wherein the plurality of mechanical attachment features and the plurality of textile features enable reversible assembly of the textile onto the housing part without distorting a cosmetic pattern on the textile and in a manner that results in no visible edges of the textile or visible attachment features on an exterior of the electronic-speaker device.

17. A textile-assembly toolkit for reversible assembly of a textile to an electronic-speaker device, the textile-assembly toolkit comprising:
a plurality of mechanical attachment features; and
a plurality of textile features formed in the textile and including knit types configured to connect to one or more of the plurality of mechanical attachment features to enable repeatable and reversible assembly of the textile to the electronic-speaker device in a manner that hides the plurality of textile features and the plurality of mechanical attachment features and leaves no visible edge of the textile on an exterior of the electronic-speaker device,
wherein the plurality of textile features are configured to removably attach the textile to the plurality of mechanical attachment features to align and secure the textile to a housing part with a tension force sufficient to reduce acoustic distortion resulting from a vibration of the textile when exposed to acoustic pressure.

18. The textile-assembly toolkit of claim 17, wherein:
the purposefully-designed knit types include knit holes and knit structure changes that correspond to one or more of the plurality of mechanical attachment features;
the plurality of mechanical attachment features include:

one or more pins positioned on an interior surface of the housing part of the electronic-speaker device and proximate to an opening in the housing part;

hook and loop material attached to the interior surface of the housing part;

a polyethylene terephthalate (PET) sheet attached to the textile and configured to rigidize a portion of the textile and enable consistent alignment of a pattern on the textile to the housing part; and one or more buttons attached to the textile and configured to secure the textile to a base of the electronic-speaker device.

19. The textile-assembly toolkit of claim 18, wherein:

the plurality of textile features include a tube formed along an edge of the textile, the tube formed in sections separated by gaps in the textile; and the plurality of mechanical attachment features include:

a retention rod positioned within the tube and configured to provide evenly-distributed tension force on the textile; and multiple hooks positioned on the interior surface of the housing part and proximate to an opening in the housing part, the multiple hooks configured to capture and secure the retention rod in the gaps.

20. The textile-assembly toolkit of claim 18, wherein:

the plurality of textile features include a knit structure change that provides additional fabric in a local area to be wrapped inside an input/output (I/O) port opening in the housing part, the additional fabric forming multiple flaps; and the mechanical attachment features include an I/O-port ring having extensions that extend into slots positioned on the interior surface of the housing proximate to the I/O-port opening, the extensions configured to removably secure the multiple flaps in the slots and retain the textile in position around the I/O-port opening.

* * * * *